United States Patent
Eichstaedt et al.

(10) Patent No.: US 6,654,735 B1
(45) Date of Patent: Nov. 25, 2003

(54) OUTBOUND INFORMATION ANALYSIS FOR GENERATING USER INTEREST PROFILES AND IMPROVING USER PRODUCTIVITY

(75) Inventors: Matthias Eichstaedt, San Jose, CA (US); Qi Lu, San Jose, CA (US); Shang-Hua Teng, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/227,225

(22) Filed: Jan. 8, 1999

(51) Int. Cl.7 .............................................. G06F 17/30
(52) U.S. Cl. ..................... 707/3; 707/2; 707/9; 707/10
(58) Field of Search ............................... 707/1, 2, 4, 5, 707/6, 9, 10; 709/100, 206, 219, 227; 445/4.2; 345/327

(56) References Cited

U.S. PATENT DOCUMENTS

| | | | | |
|---|---|---|---|---|
| 5,717,913 A | * | 2/1998 | Driscoll | 707/5 |
| 5,724,567 A | * | 3/1998 | Rose et al. | 707/2 |
| 5,754,939 A | * | 5/1998 | Herz et al. | 455/4.2 |
| 5,813,009 A | * | 9/1998 | Johnson et al. | 707/100 |
| 5,835,087 A | * | 11/1998 | Herz et al. | 345/327 |
| 5,893,091 A | * | 4/1999 | Hunt et al. | 707/3 |
| 5,926,812 A | * | 7/1999 | Hilsenrath et al. | 707/5 |
| 5,940,821 A | * | 8/1999 | Wical | 707/3 |
| 5,974,413 A | * | 10/1999 | Beauregard et al. | 707/6 |
| 6,029,195 A | * | 2/2000 | Herz | 709/219 |
| 6,108,645 A | * | 8/2000 | Eichstaedt et al. | 707/1 |
| 6,115,709 A | * | 9/2000 | Gilmour et al. | 707/9 |
| 6,169,989 B1 | * | 1/2001 | Eichstaedt et al. | 707/100 |
| 6,247,010 B1 | * | 6/2001 | Doi et al. | 707/3 |
| 6,366,956 B1 | * | 4/2002 | Krishnan | 709/223 |

OTHER PUBLICATIONS

Applying evolutionary algorithms to the problem of information filtering—Tjoa, A. M., Sep. 1997.*

* cited by examiner

Primary Examiner—Jean M. Corrielus
Assistant Examiner—Anh Ly
(74) Attorney, Agent, or Firm—Lumen Intellectual Property Services, Inc.

(57) ABSTRACT

A system for automatically generating user interest profiles and delivering information to users learns a user's interests by monitoring the user's outbound communication streams, i.e., the information that the user produces either by typing (e.g., while a user is composing an e-mail message or editing a word processor document) or by speaking (e.g., while a user is engaged in a phone conversation or listening to a lecture). The system uses the monitored text to build (and possibly update) a user interest profile. The profile is constructed from current text generated by the user, so that the retrieved information reflects present user interests. In addition, the profile may also retain past user interests, so that the profile reflects a combination of past and present user interests. The system then automatically queries diverse databases for information relevant to the interest profile. The databases may include internet web pages, files stored on the user's local network, and other local or remote data repositories. The queries may use a combination of internet search engines, the specific selection of which may depend upon the nature and/or content of the queries. The information retrieved in response to the queries is then presented to the user. The retrieved information may contain, for example, answers to questions that the user might ask and/or data related to the user's current and continuing interests. Because a user's current speech or typed text is highly correlated with the user's current interests, the retrieved information will be relevant to the user's actual interests. The communication stream monitoring, interest profile building, data base querying, and presentation of retrieved information are all performed automatically, in real time, and in the background of current user activities.

14 Claims, 4 Drawing Sheets

OUTBOUND INFORMATION ANALYSIS FOR GENERATING USER INTEREST PROFILES AND IMPROVING USER PRODUCTIVITY

FIELD OF THE INVENTION

The present invention relates generally to computer implemented methods for determining current interests of a person, and using such information for improved user productivity. More specifically, the invention relates to methods for automatic, real-time generation of a user interest profile from current user input communication data streams, and for automatically providing useful information to the user based on such data streams.

BACKGROUND

A widespread use of databases is to provide relevant information in response to user queries. Recently, the amount of available information has exploded, due primarily to the dramatic proliferation of the world wide web and the internet. The world wide web can be viewed as a very large information repository that offers a vast variety of general as well as special purpose search engines and information retrieval systems. Consequently, finding the right databases and the right way to query them is getting harder and harder. Moreover, finding relevant information on the world wide web will become even more challenging as the web continues to grow. Existing information retrieval systems, search engines, and "pushed" content providers are attempting to provide users with useful information related to their interests. These systems typically obtain hints on the user's interests from various sources. The most elementary and straightforward approach is to simply ask the user to manually specify his or her interests, which are then stored in a user interest profile. This approach has the disadvantage that it requires the user to manually specify and update the profile. It is neither dynamic nor automatic. Another approach is to analyze the user's click stream during web browsing sessions. In other words, the system monitors and records the hyperlinks (i.e., URLs) selected by the user. A similar approach is to introduce a proxy server between the user and the internet. The proxy server monitors the hyperlinks selected by the user during browsing sessions and derives interest profiles from the usage statistics. Although both these approaches are automatic and do not require the user to manually update his or her interest profile, selected hyperlinks are not strongly correlated with the user's current interests. Consequently, automated database queries based on selected hyperlinks often return information that is of little relevance to the user's actual interests. These approaches also have the disadvantage that they obtain information about the user's interests only during web browsing sessions.

SUMMARY

The present invention overcomes the above disadvantages by providing a new system for automatically bringing information to users. The system does not require users to manually specify their interests, nor does it derive user interests from selected hyperlinks during web browsing sessions. Instead, the system learns a user's interests by monitoring the user's outbound communication streams, i.e., the information that the user produces either by typing (e.g., while a user is composing an e-mail message or editing a word processor document) or by speaking (e.g., while a user is engaged in a phone conversation or listening to a lecture). In contrast with prior systems which monitor selected hyperlinks during web browsing sessions, the system of the present invention monitors text generated by the user while typing or speaking, regardless of whether or not the user is currently browsing the web. The typing or speaking is performed by the user while editing or composing text within an application program having text editing functionality. The system then uses the monitored text to build (and possibly update) a user interest profile. The profile is constructed from current text generated by the user, so that the retrieved information reflects present user interests. In addition, the profile may also retain past user interests, so that the profile reflects a combination of past and present user interests. The system then automatically queries diverse databases for information relevant to the interest profile. The databases may include internet web pages, files stored on the user's local network, and other local or remote data repositories. The queries may use a combination of internet search engines, the specific selection of which may depend upon the nature and/or content of the queries. The information retrieved in response to the queries is then presented to the user. The retrieved information may contain, for example, answers to questions that the user might ask and/or data related to the user's current and continuing interests. Because a user's current speech or typed text is highly correlated with the user's current interests, the retrieved information will be relevant to the user's actual interests. The communication stream monitoring, interest profile building, data base querying, and presentation of retrieved information are all performed automatically, in real time, and in the background of current user activities. The present system, therefore, provides a system for automatic, real-time generation of a user interest profile from current user speech and/or text data streams, and for automatically presenting useful information to the user based on current user data streams. Because the system is automatic, real time, and provides information relevant to the user's current interests, it provides increased convenience and productivity to the user. These and other advantages of the invention will become apparent from the following description of the preferred embodiments and accompanying drawing figures.

DETAILED DESCRIPTION

Although the present invention has many diverse applications and embodiments, for purposes of illustration, particular embodiments of the invention are described below in detail. It will be appreciated by those skilled in the art that many of these details may be altered in obvious ways without departing from the spirit and scope of the invention.

Active E-Mail

Figure 1:
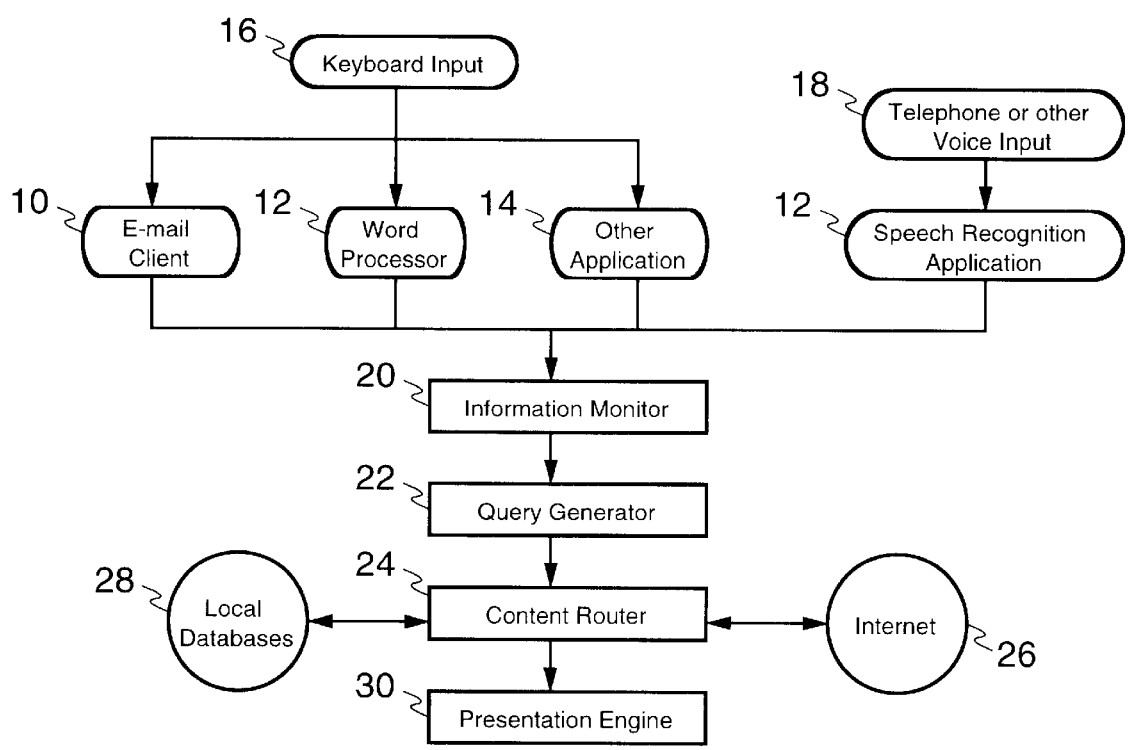
FIG. 1 illustrates an overview of an embodiment of the invention designed to actively retrieve and present information relevant to text typed and/or spoken by a user.

A preferred embodiment of the invention, called an active e-mail system (AES), is illustrated in FIG. 1. In this embodiment, a method according to the present invention is implemented in conjunction with, or integrated with, an e-mail 10, word processing 12, or other application program 14 running on a desktop computer. The method automatically and actively provides the user with information relevant to what the user is currently typing on a keyboard 16 or speaking into a telephone or other voice input 18. The program implementing the method runs in the background in real time while the user is typing or speaking. An information monitor 20 automatically monitors text derived from a user. A query generator 22 generates database queries based on the monitored text. A content router 24 retrieves from the internet 26 and/or local databases 28 information relevant to the monitored text, such as a list of references to database documents. A presentation engine 30 presents the retrieved information to the user, typically in a separate window beside a window in an active application program in use by the user.

In contrast with the active e-mail system of the present embodiment almost all current e-mail systems are passive, i.e., they do not actively search out and present to the user any information that the user may find helpful in composing a new e-mail message. They only provide the user with a mechanism to view the incoming messages and to generate new outgoing messages. When a user is writing an e-mail message, the mail client does not give much more help than providing an editing environment. Although the user can manually search for other relevant information resources, this searching is time-consuming and distracts the user from the task of composing the e-mail message itself. The AES, on the other hand, transparently issues queries and displays the results to the user in order to assist the current or the near-future e-mail writing. The objective of the AES is to enhance the productivity and creativity of an e-mail writer using the partial information that he/she just provided through typing.

AES analyzes the recipient, the subject and the body of the e-mail being composed, and searches the internet and local databases for relevant information that might be useful for this e-mail or other tasks of the user. For instance, when the name of a certain company appears in the message, information about its current stock price and recent news can be collected; if the e-mail says "want to go to lunch?", AES can automatically collect information about possible restaurants; or in general, information about the recipient can be useful, for example, their street address, previous e-mail messages, and job title.

In the present embodiment, AES operates transparently in the background and does not interrupt the user's natural work flow. In real time, relevant information is retrieved from the Web, from local databases, or from other sources in the background while the user types on the keyboard or talks (on the phone, for example). The search results are then displayed to the user in a AES window (preferably positioned beside windows of the current application). Alternatively, the search results can be automatically incorporated into the current application so that they are easily accessible for integration. Although the AES information is normally presented only to the user whose typing or speech is being monitored, in some cases it may also be presented to other selected users on a local network.

In the AES system, the e-mail client program 10 is connected to the information monitor 20 so that any typing will be captured by the AES. Implementing this capturing is a relatively easy engineering problem, which may be solved by various techniques, e.g., by using the API of the Lotus Notes e-mail client. After the information is captured, query generator 22 parses the e-mail and extracts and classifies important keywords. This stage extracts names, organizations, topics, and so on, and classifies them. Tools presently exist to perform this particular task. For example, IBM announced a facility to identify names from text. This system can not only identify individual names and group different variants of the same name together, but can also identify organizations and companies and recognize them as such. Topics can be identified using a thesaurus and a classification system, removing common words through a very liberal use of a stop word list. We expect users to communicate mostly within one area, and to have access to a thesaurus for this area (e.g., chemical engineering, medical, law).

Once the classified keywords are obtained, the query generator uses them to construct on-the-fly queries related to these keywords, and sends these queries to the appropriate search engines, with formats appropriate to each search engine used. Known techniques (e.g., implemented in systems like the Information Manifold and the Search Broker) can be used to translate queries to fit almost any web search engine. Using such techniques AES is able to submit queries in diverse subjects to the search engine that covers that subject. Since we concentrate on relatively few types of subjects—names, companies, devices, etc.—we expect to be able to provide effective access to them.

Once we have extracted and classified the keywords from the e-mail, we will run them through a rule-based query-construction. This rule-base, in our current design, is manually built, containing rules for generating queries from some classified keywords. For example, if the keyword is a company name, the rule-base will specify how to generate queries about their current stock value, recent news, addresses, web pages, and so on. If the keyword is a concept, for example, "knowledge-based", queries from technical dictionaries or encyclopedias will be generated. Rules can also be collected over time, built by the company and distributed to all employees, or learned by example from the user's "manual" querying.

The presentation engine combines and presents all the results to the user. This step is performed by collecting all the information, generating a short description of each piece (e.g., the query and the first sentence of the results), and putting it in one web page (e.g., a "tell me more" page), with links to the different pieces. Users can look at that page at any time, and select the piece of interest.

Since AES provides hints and additional information, rather than authoritative answers to specific questions, a relatively low precision of queries is sufficient.

Overall, AES provides:

personal information about the message recipient(s); for example, address, title, company name, spouse (very useful to add a polite note), kids, home page, and biographical data.

relevant information about the subject and the main topics of the e-mail. For instance, if the subject of the e-mail is about a particular conference, AES will gather the conference page, call for papers, information about invited speakers, and city information.

news and general information about companies, products, locations, and other easily distinguishable names.

previously received messages from the same list of participants, any subset of it, or the same topic.

reusable text that can be recycled in the current e-mail message with or without modification. For example, if the subject or the topic of the e-mail is about an invitation or an acknowledgment, AES will search for sample templates.

the techniques described above for active e-mail can be extended to other communication platforms and environments such as phone conversations and classroom lecturing. For example, a conversation over the phone about a street address can be used to retrieve maps and driving directions. If a professor mentions "entropy" in a lecture, AES can automatically generate queries to find the definition of entropy, typical uses of the word, relevant books, etc. Although the above discussion is focused on an e-mail application program, the techniques can also be used with other application programs such as word processors and other programs in which the user enters text by typing or speaking.

Profile Generation

The AES described above may be supplemented with various profile generation techniques. Using the information related to the e-mail message currently being composed by the user and/or the information derived from the user's recent speech, a user interest profile is generated in real time by the information monitor. The supplemented AES can be configured so that a new profile is generated based only on the current e-mail message and/or based only on the user's recent speech. Alternatively, the supplemented AES may be configured to generate and maintain user interest profiles that reflect relatively long-term interests. These profiles can be used to deliver to the user information that is relevant to both current interests (i.e., interests based on information generated by the user during the most recent minutes or hours) as well as long-term interests (i.e., interests based on all the information ever generated by the user). In addition, both current and long-term interests may also be combined automatically to generate profiles using a time-dependent mechanism to model dynamically changing interests so that the generated profiles can accurately reflect the current interests of an individual, appropriately balanced with the long-term interests.

Although these profile generation techniques can be used to enhance the AES embodiment described above, it should be noted that user interest profiles generated by these techniques can be used by other application programs, as well as by any information push system to deliver relevant personalized information to the user. A key aspect of the techniques of the present invention is the analysis of the outbound communication stream. In this section, we describe in more detail the functional components for the query generation based on the outbound information stream and present an application for automatic profile generation.

The reader will recall that the main components of the AES are an information monitor 20, a query generator 22, a content router 24, and a presentation engine 30 for the search results. FIG. 1 illustrates these four components and their interconnections. Typically, variations of these four components (or their functional equivalents) will also be present in most other embodiments of the present invention. In particular, a system for automatically generating and updating profiles based on outbound information streams will also incorporate these or similar components.

Figure 2:
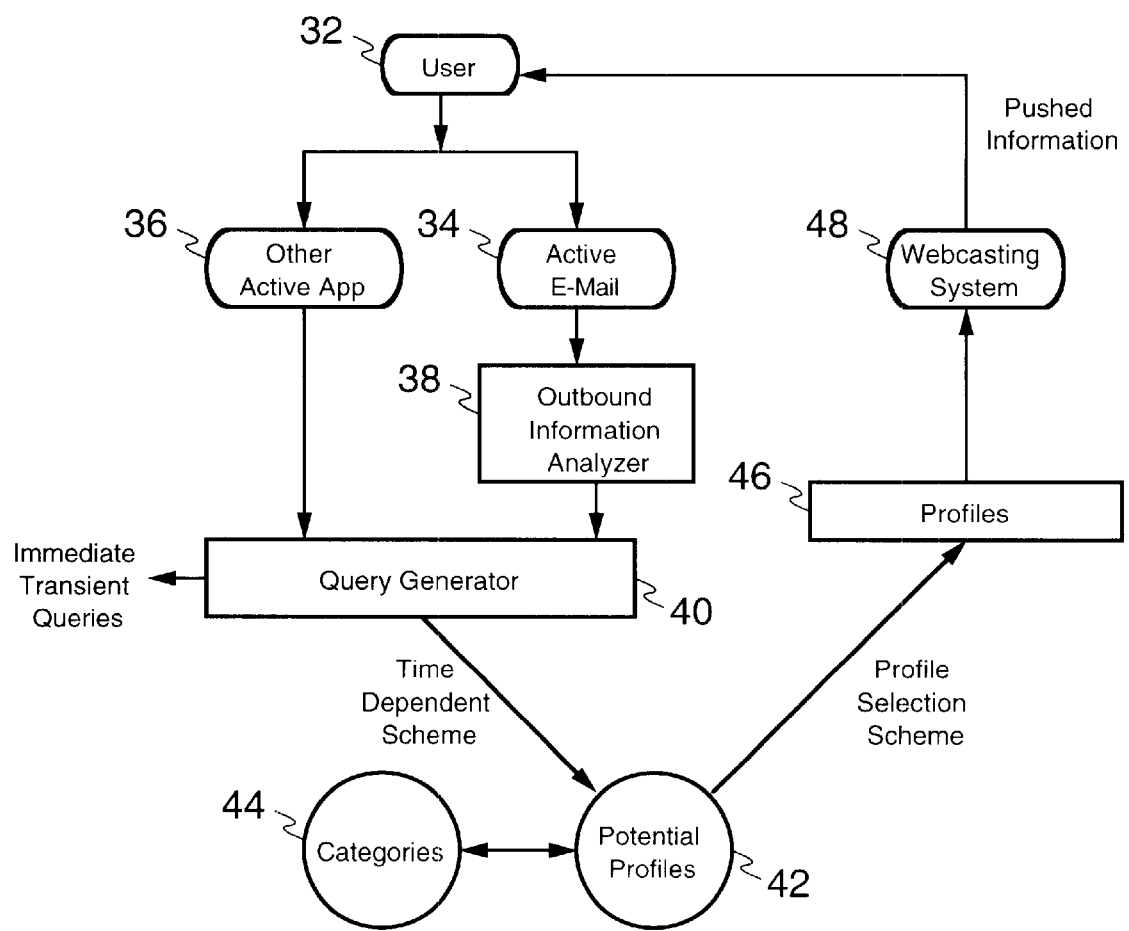
FIG. 2 shows a system design for an embodiment of the present invention that includes outbound-based profile generation.

FIG. 2 illustrates a profiling system according to the invention wherein a user outbound information stream is used for user interest profile generation. As shown in the figure, the active e-mail application 34 taps into the user's current outbound information stream, as described above in relation to FIG. 1. As the information gets collected it is passed on to the outbound information analyzer 38. The analyzer is the component that extracts the user's interests and information needs. In addition, the analyzer can access the user's local disk to search for related files. There are two types of information that need to be extracted. One type is the user's long term interests which contain topics that are mentioned over and over again (e.g., working on a project, looking for a new house, etc.). This type of data contributes to building up a long term user profile. The second type of information contributes to short term interests (e.g., next week's acquisition plans), which are relevant for information retrieval systems such as an active calendar. The query generator 40 analyzes the data and generates a set of features for the current information. Recent research in the area of information retrieval systems shows that useful features can be extracted automatically from unstructured text documents with high accuracy. One such system has been developed at the IBM Almaden Research Center and is called AIM (Automatic Informative Metadata). AIM uses various characteristics to describe a text document. In addition to the keywords of a document, it uses the language the document is written in, the subject, the writing style, and the profession (classes of vocabulary). The writing style, for example, is computed as a function of the words belonging to complete sentences, percentage of sentences that end in a question mark, and the Kincaid reading level, which is itself a function of the syllables per word and the number of words per sentence.

The metadata or characteristics about the current information stream are passed to the content router. The content router maintains a list of on-line information resources and issues queries to those repositories. Which search engines are used for a query depends on the metadata information that is delivered from the query generator. For example, a metadata document containing the keywords "Java member variable" and a high percentage of sentences ending in question marks indicates that the user is working on a problem related to the Java programming language. As a result, the content router can retrieve technical documentation about Java. As another example, the content router can retrieve information from on-line stores when the user enters a shopping list or a recipe. The content router resembles the functionality of the Search Broker.

In a preferred embodiment, we use a database to support query formation. The database contains a set of keywords (e.g., "stocks", "vacation") and a set of rules (e.g., for recognizing people's names, cities, or organizations) for extracting basic query units. The system then uses (in the case of AES) the two-level hierarchy (i.e., the subject and the body) to form key-tuples which are a combination of the basic query units in the subject and the body text. For example, if the subject contains "stocks" and the body contains "Intel", then (stocks, Intel) forms a key-tuple. Alternatively, we can compose key-tuples based on the adjacency of keywords in the body text. It will be appreciated that more advanced natural language software may be incorporated to generate more sophisticated query units (such as those expressed by Boolean expressions).

In the present embodiment, the technique makes use of a broker database. For each key-tuple, it contains a list of queries of the format (search engine, query content). For example, the key-tuple (stock, Intel) may be linked with (Yahoo!, "finance Intel"), (stockmaster.com, "Intel"), (CNN, "computer industry"), (Altavista, "Intel+Release"), (IBM-patent-server, "Intel+Microprocessor"), (CLEVER, "Intel"), etc. Conceptually, the router can be regarded as a Yahoo-like tree, where each path from the root to the leaf corresponds to a prefix of a key-tuple, and each leaf is linked to a collection of search engines, rather than a collection of pages.

As in the previous embodiment, a presentation engine presents the search results to the user in an easily accessible manner. The search results can be displayed in a different window where the user can scan through the relevant documents and find assistance for his/her current activities. Another way of presenting the information is to make it available in the current application. When editing an e-mail message, for example, the retrieved information can be accessible from within the editor so that it can be copied into the current message.

In summary, these four components extract metadata from the user's current outbound communication stream and use that metadata to issue queries against appropriate on-line information repositories.

User interest profiles are often used in a webcasting system 48 to screen out irrelevant documents and deliver attractive content to users. A drawback of prior content delivery systems is that the user has to extensively interact with the delivery engine in order to customize his/her interest profile. Some customization schemes use Boolean search expressions while others employ relevance feedback from the user to derive the interest profile. This manual customization process is tedious and time consuming. Moreover, novice users have to learn how to interact with the delivery engine to get the desired results. One common approach for automatic profile generation is to analyze the user's information access pattern such as using click stream analysis on a web server or on an intermediate host. However, it is difficult to determine a user's interest just from clicks on hyperlinks because the user may have clicked the link by accident and not because of his or her actual interests. In this embodiment, on the other hand, the outbound information stream of a user is used for automatic profile generation. The technique of the present invention differs from the prior techniques in that the technique of the present invention uses the information content directly provided by the user by typing or speaking. This information is most relevant to the current activities.

An important issue for automatic profile generation is to combine dynamically available information with the existing profile of a user. We now present a time-dependent mechanism to model dynamically changing profiles so that the generated profiles accurately reflect the long-term interests of an individual, as well as current interests. As shown in FIG. 2, a user 32 of the system interacts with an active e-mail application 34, as discussed above, or with another active application 36. An outbound information analyzer 38 monitors and analyzes the outbound information stream from the active application, and a query generator 40 uses the information to formulate queries. Whereas the AES system uses these queries to immediately retrieve information from the internet or other databases, the present embodiment uses these queries to generate user interest profiles. To dynamically maintain and generate user profiles, the system maintains a database 42 of potential profiles. The system then applies a profile selection scheme to construct the final profiles 46. These profiles may then be used by a webcasting system 48 that provides pushed content to the user 32.

In the profile generation system of this embodiment, it is assumed that each information document and query (generated by active e-mail application 34) has already been classified using an existing taxonomy such as Yahoo!. In other words, each query from active e-mail application 34 has been assigned to a non-empty subset of categories of a known taxonomy tree. Note that our system works with any existing taxonomy tree and does not require any changes to a legacy system. Taxonomies are available for almost all domain specific document repositories because they add significant value for the human user. For example, all U.S. patents are categorized into a classification tree which is defined by the U.S. Patent Classification. Using the subject and body of an outbound e-mail written about a new idea, the system can automatically generate queries about certain categories of the classification. As another example, most Web search engines (such as Yahoo!, Excite, Lycos, and Infoseek) provide a taxonomy that categorizes popular web pages and a map that assigns a keyword to a subset of categories.

For simplicity, we assume that all documents and queries are assigned to the leaf categories of a taxonomy tree. In cases where existing systems have documents assigned to an inner category we can create a new child of the inner node and assign all documents to the new child node. With this assumption, each category of the taxonomy tree is a candidate of the profile database. Let $C=\{c_1, c_2, \ldots, c_K\}$ be the set of all categories. These categories are stored in a database 44. The mapping from a query q to categories can be fonnally defined as a function $\pi(q)=(\pi^1(q),\pi_2(q),\ldots,\pi_K(q))$, where for each i, $\pi_i(q)$ assigns a real value to measure the degree of relevancy, or interest, between the query q and the category $c_i$. We will refer to $(\pi_1(q),\pi_2(q),\ldots,\pi_K(q))$ as the relevance vector of query q. If $\pi_i(q)=0$, then q is irrelevant to $c_i$. One technique for computing the components $\pi_i(q)$ of the relevance vector $\pi(q)$ of a query q is to use the search results obtained by the active e-mail system. For example, if one of the returned documents belongs to category $c_i$, then we assign $\pi_i(q)=1$. We can also use other data classification techniques to generate the relevance vector.

Figure 3:
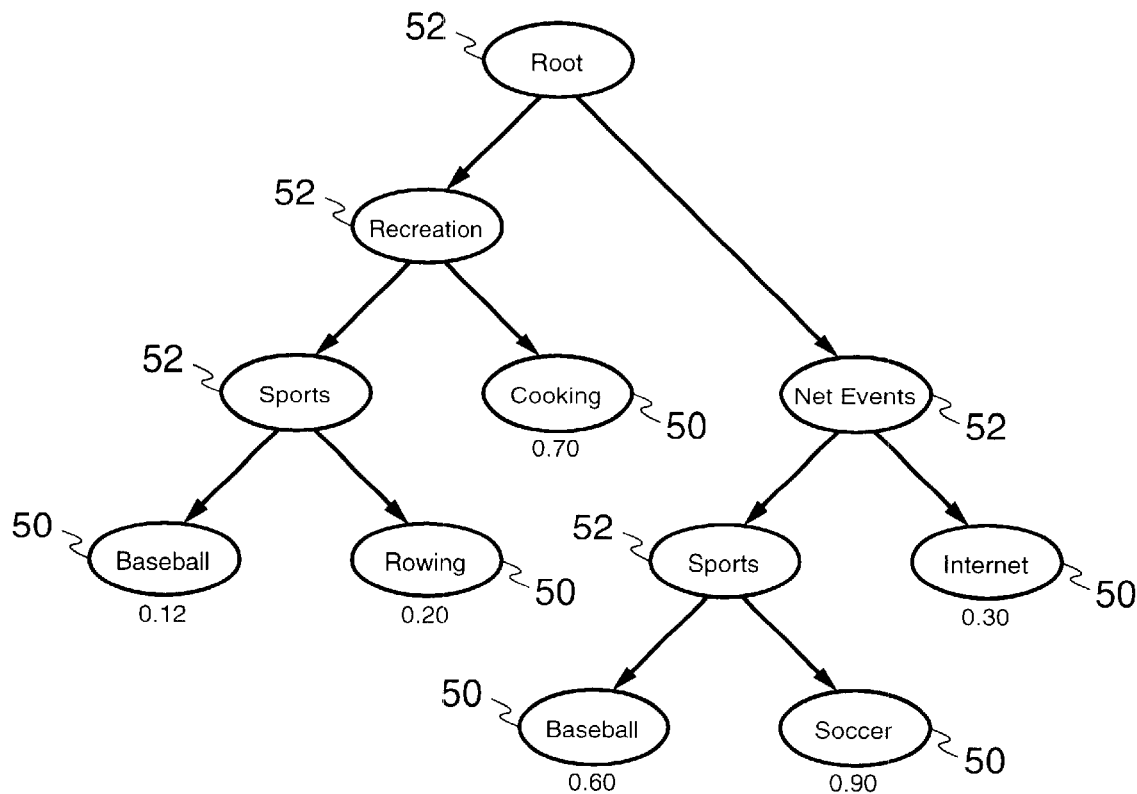
FIG. 3 illustrates a taxonomy tree of categories according to an embodiment of the present invention.

FIG. 3 illustrates a taxonomy tree with six leaf categories 50 and five inner categories 52. Each leaf category 50 has an interest value associated with it for a particular query. In the present embodiment, the database of potential profiles 42 contains the collection of all categories. Each category is a potential candidate for inclusion in the profile. The system generates and maintains a weight vector w to measure the user's current interest level in each category. The weight vector has K entries and initially we can assume $w=(0,0,\ldots,0)$. The updating of the database-of-potential-profiles (DOPP) involves the use of a scoring function s(w,r) to compute a new weight vector $w'=s(w,\pi(q))$ from a given query q and an existing DOPP weight vector $w=(w_1, w_2, \ldots, w_K)$. A simple scoring function is to average the contribution of all previous queries. Suppose q is the $L^{th}$ query to be incorporated. The average is then given as:

$$w'=s(w,\pi(q))=(1-1/L)w+(1/L)\pi(q).$$

Averaging, as defined above, can be implemented incrementally, so there is no need to compute it from scratch every time. In particular, there is no need to store previous queries and their contributions in order to compute the current DOPP weight vector.

To accurately reflect the current interests of an individual, the DOPP updating function needs to give more weight to newly generated queries. In addition, we would like to use a scheme that is incremental and as simple and efficient as averaging.

Note that the averaging formulation is a convex combination of w and $\pi(q)$, i.e., $$w'=(1-\beta)w+\beta\pi(q),$$

where the convex coefficient $\beta$ is $1/L$. A simple scheme for giving recent queries more weight is to choose a parameter $\alpha_L$ such that $1 \leq \alpha_L \leq L$, and let $$w'=s(w,\pi(q))=(1-\alpha_L/L)w+(\alpha_L/L)\pi(q).$$

Note that there are two extreme cases of the above formula: when $\alpha_L=1$, it is the averaging scheme; when $\alpha_L=L$, it is the replacement scheme, where the weight is simply $\pi(q)$. A nice property of the convex combination is that if $|w|<1$ and $|\pi(q)|<1$, then $|w'|<1$. So if we interpret $w'_i>0$ as the likelihood that the user is positively interested in category $c_i$, and $w'_i<0$ as the likelihood that the user has a negative interest in category $c_i$, then the convex combination will always result in a valid likelihood measurement.

To model the decay of the previous interest as a function of time, we can introduce a vector of decay factors $\lambda=(\lambda_1, \ldots, \lambda_K)$, one entry for each category. We then define $$s(w,\pi(q))=w \cdot e^{-\lambda}+(1-e^{-\lambda}) \cdot \pi(q),$$

where $e^{-\lambda}=(e^{-\lambda_1}, \ldots, e^{-\lambda_K})$. Note that the decay factors for different categories can be different. For example, a category dealing with the art of painting can have a slower decay rate than a category for classified adds because users typically have a long-term interest in arts.

In the preferred embodiment, the e-mail analyzer can extract both positive and negative interest about any category $c_i$. In some cases, w and $\pi(q)$ may disagree in sign for some of their components. There are several ways to handle this situation. One approach is to simply add them and allow cancellation to take place, so that the negative interest partly or entirely cancels the positive interest. Another approach that the present embodiment uses is to let the current interest, represented by $\pi_i(q)$, dominate the past interest, represented by $w_i$. In other words, if the two differ in sign, simply set $w'_i=\pi_i(q)$.

It will be recognized that each e-mail, document, or other outbound communication stream may result in multiple queries. If we treat each of these queries separately, then we will not only increase the number of updates to the profile database (less efficient), but also increase the overall denominator L, which will weaken the weight of the new contributions. Two separated queries may address different aspects of the user's interests, however, and there may not be many common categories to the two queries. Consequently, the following technique is used to combine the contributions of the queries from the same e-mail or document into a single vector. Suppose an e-mail generates n queries, $q_1, q_2, \ldots, q_n$. Let $r^{(i)}=(r^{(i)}_1, \ldots, r^{(i)}_K)=\pi(q_i)$ be the relevance vector for the $i^{th}$ query. We calculate a combined relevance vector $r=(r_1, \ldots, r_K)$ for all n queries as follows: (1) if the $j^{th}$ entries in all n vectors are positive, then we set $r_j=\max_i (r^{(i)}_j)$; (2) if the $j^{th}$ entry in any vector is negative, then $r_j=\min_i(r^{(i)}_j)$; This combination scheme is based on the assumption that negative weights are much more carefully generated from the e-mails. This assumption, of course, depends on the progress of natural language understanding. Obviously, other combination schemes may be used to calculate r to obtain similar results.

The present embodiment uses the convex combination to define a decay function as the scoring function to express the fact that older interests become less important over time. The combination technique and the decay function technique can be used together to put a real time stamp in the weight vector. The issue is that e-mails on the same day or even the same week may have the same credit in their contribution to the profile. The e-mail-by-email contribution methods discussed above give later e-mails more credit than if updates were performed on a query-by-query basis. With the combination technique, we combine the contribution of all e-mails during a period of time to generate a combined relevance vector for the period and we then apply the scoring function.

The automatic profile generation system adjusts profiles to the user's changing interest by carefully monitoring the weights in the DOPP. When a sufficient number of e-mails or documents concerning a particular category outside the scope of the current profile has occurred, the user interests have changed to include new categories. The present embodiment applies a threshold $\Theta_S$ to select new categories in DOPP that are of high likelihood of interest to the user. For example, we can set $\Theta_S=0.75$. We call this threshold the selection threshold. Similarly, we have a threshold $\Delta_s$ which selects new categories in DOPP that have high negative score. The negative profile will help the webcasting system to filter out certain classes of documents. Most webcasting systems can "verify" the new selection by running the following controlled experiment. The webcasting system intensifies the stream of documents from that particular category over a certain period of time (say one or two weeks). During this time the delivery engine will present documents from the category in question on a daily basis and then perform a click stream analysis.

When the DOPP shows that the interest in a category from the profile is too small, we will remove the category from the profile. We define two thresholds $\Theta_U$ and $\Delta_U$ for unsubscribing positive and negative categories from the profile. Again, we could also use the click-stream analysis to verify that the user is indeed no longer interested in the categories.

Figure 4:
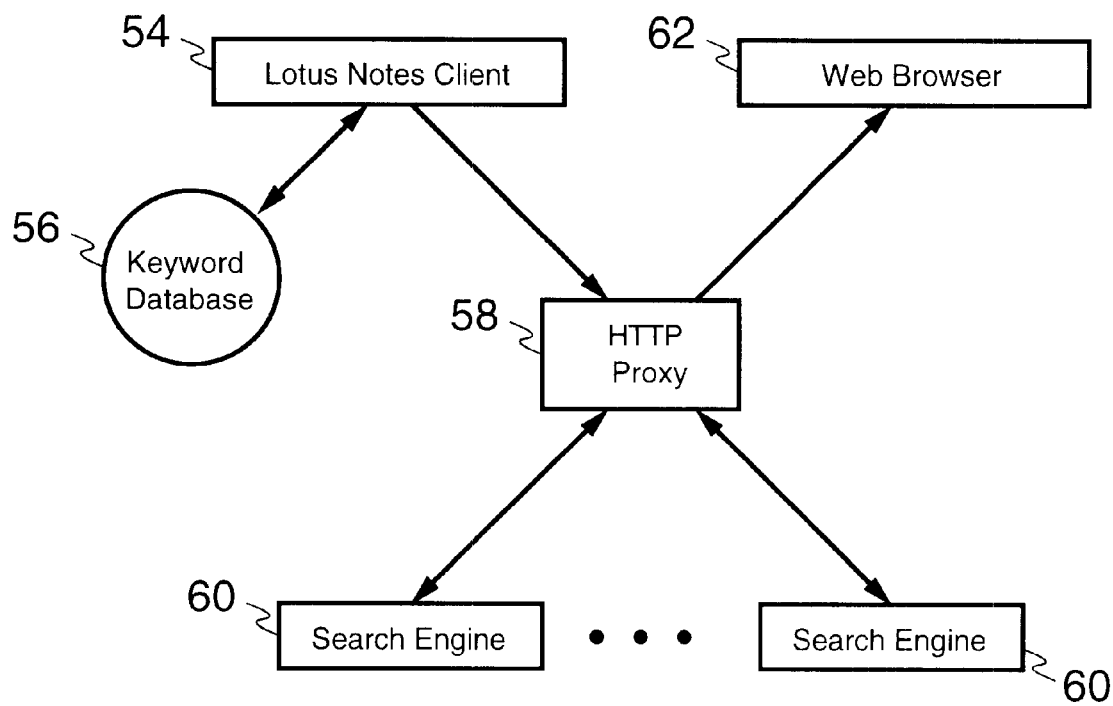
FIG. 4 illustrates the functional components of an embodiment of the present invention and shows the information flow.

The present embodiment may be implemented in a variety of different ways. One possible implementation is based on the Lotus Notes client, and it uses Lotus Script for extracting keywords and building the transient queries. FIG. 4 illustrates the functional components and shows the information flow in our system. The Lotus Notes client 54 provides an editing environment and hosts the code to distill keywords and to trigger queries. Due to the limited networking capability in Lotus Script an HTTP proxy 58 is used for converting HTTP GET requests from the Notes client into POST requests. The queries are submitted to search engines 60, and the results from each query are displayed in a regular web browser 62.

The Lotus Notes client 54 extracts the words that the user is typing and eliminates stop words (e.g., "is", "a", "the", ... ). For each word, the system performs a lookup in a keyword database 56. The keyword database maps keywords and phrases to a set of search engine identifiers. For each search engine the system stores the exact specification on how queries to that particular engine are issued (e.g., URL, variable names used in the submission form). We use a regular Notes database to store the keywords and the links to the search engines because Lotus Script provides convenient methods to access the database records. When the user types a keyword that is contained in the keyword database, a set of queries is generated and submitted to the appropriate search engines 60.

Another important piece of information is the field or window in which the user is currently typing. For example, we treat the "To", "Subject" and "Body" field of an e-mail message differently because they contain different types of information. The "To," "CC," and "BCC" fields always contain names. Although the e-mail sender probably knows the recipient, this is not always the case. And even then, some more information about the recipient can be very useful sometimes; for example, a link to all previous e-mail messages, a street address, or information from the organization personnel database. The "Subject" field is submitted to a general search engine such as Clever or Yahoo!. The keywords in the body of the message are submitted to the search engine that is specified in the keyword database.

The following example illustrates the kinds of information our system retrieves when typing a simple e-mail message about acquiring a software company. When entering the recipient of the message the browser presents detailed information about the receiver from IBM's internal phone directory. While typing the subject "Acquisition of ABCXYZ" our system extracts the keyword ABCXYZ and issues a query to a popular investment web site to obtain information about the current stock price and related news articles. Suppose the following text is typed in the body of the e-mail:

"About the acquisition of ABCXYZ: talk to Bill Smith (the guy who did the previous one), especially about their latest product, the super-gadget."

While typing this text in the body of the e-mail, the system is triggered on certain keywords (such as "Bill Smith") and immediately submits a query, the results of which can remind the writer about other pieces of information that may be useful in composing the rest of the e-mail. For some unique names, like the "super-gadget", an Alta Vista search may be useful.

In summary, the system performs the following five steps to retrieve relevant information.

1. Extract keywords and eliminate stop words;
2. Lookup of keywords in the database;
3. Retrieve search engine information if the keyword was found in the database;
4. Submit the query to search engines;
5. Display the results in a web browser;

The system automates the generation of user profiles by transforming the transient queries into a persistent interest profile for each user. The profile generation scheme is based on an existing webcasting system. In this system each user profile is a collection of predicates that identifies the type, quantity or quality of information that the user wishes to receive. The predicates are connected by the operators AND, OR and NOT to form Boolean expressions. Our assumption is that the documents of our webcasting system are already categorized within an existing taxonomy tree.

The following key idea is used to transform a query into a vector of interest values w. First, we issue the query against our taxonomy tree and count the number of hits $h_i$ in each category i. In a second step we divide the total number of documents in each category $t_i$ by $h_i$. We use the resulting vector $w=(h_1/t_1, \ldots, h_K/t_K)$ for our updating function as described earlier.

The techniques presented in the above embodiments are not limited to an Active e-mail System or a profile generation system as described. They can be applied to other applications and environments although the implementation details will be different. For example, with the help of a speech recognition software, the query and profile generation scheme can be extended to monitor phone communication. For example, when a sales representative calls a customer the system can automatically gather and present information such as previously sold products and news articles about the company that the customer works for. The system can also use text derived from speech to generate user interest profiles. Another application for the query generation system is for classroom lecturing and presentations. For example, while a professor is lecturing, the system can automatically generate queries from certain keywords (such as entropy, mesh, Euler, etc.). The system can retrieve the definition, typical uses of the keyword, relevant books, etc. A similar design can be used in talk shows, sports programs, study and discussion groups, etc. The profile generation scheme presented here can also be applied to Active Calendars. Active Calendars extend a traditional information management system by automatically adding relevant information to calendar entries. AES and Active Calendars are similar in that they both act on the information that the user enters by predicting the user's information needs. We can combine our profile generation scheme with queries generated from Active Calendars to derive long term interests for the user. Analyzing e-mail communication has also been used to classify experts within a company, allowing people to direct their questions to the right place. These and many other variations and applications of the present invention are considered within the spirit and scope of the invention, as defined by the following claims and their legal equivalents.

What is claimed is:

1. A computer-implemented method for determining an interest profile of a user based on the user's outbound communication streams, comprising:

monitoring in real time a text information stream entered by the user of a computer application program comprising text editing functionality, wherein the text information is based on the user's outbound communication streams and wherein said text information is not a search query;

extracting keywords from the text information, wherein the keywords are not defined by the user nor guided by the user;

generating database queries from the keywords wherein the generation of database queries is not defined nor guided by the user;

retrieving database information relevant to the queries; and presenting the database information to the user, wherein the database information is of interest to the user and based on the user's outbound communication streams;

wherein the monitoring, generating, retrieving, and presenting are performed automatically and in the background while the computer application program is being used.

2. The method of claim 1 wherein the computer application program is an e-mail client application program.

3. The method of claim 2 wherein the text information stream comprises text content of e-mail message fields generated by the user while typing or speaking.

4. The method of claim 1 wherein the database queries are generated with formatting appropriate for multiple distinct databases.

5. The method of claim 1 further comprising submitting the database queries to web search engines, and wherein retrieving database information comprises receiving search results from the search engines.

6. The method of claim 1 wherein the database information comprises references to local documents.

7. The method of claim 1 wherein the database information comprises references to web documents.

8. The method of claim 1 wherein presenting the database information to the user comprises displaying to the user references to database documents.

9. The method of claim 1 further comprising automatically incorporating the database information into the application program.

10. A computer-implemented method for determining an interest profile of a user based on the user's outbound communication streams, comprising:

monitoring in real time a text information stream entered by the user of a computer application program comprising text editing functionality, wherein the text information is based on the user's outbound communication streams and wherein said text information is not a search query;

generating database queries from the text information wherein the generation of database queries is not defined nor guided by the user;

calculating for each of the database queries a relevance vector, wherein each component of the relevance vector measures a relevance of the query to a predetermined category of a taxonomy tree; and computing the user interest profile from the relevance vectors calculated for the database queries;

wherein the monitoring, generating, calculating, and computing are performed automatically and in the background while the computer application program is being used.

11. The method of claim 10 further comprising retrieving database information relevant to the profile; and presenting the database information to the user.

12. The method of claim 10 wherein computing the user interest profile comprises identifying long-term interests, identifying short-term interests, and forming a weighted combination of the long-term interests and the short-term interests such that long-term interests decrease in significance over time.

13. The method of claim 10 wherein computing the user interest profile comprises selecting the user interest profile from a database of potential profiles.

14. The method of claim 10 wherein generating database queries comprises extracting basic query units using a set of rules and a database of keywords, and forming key-tuples from the text information generated by the user.

\* \* \* \* \*